US008448513B2

(12) United States Patent
Lin

(10) Patent No.: US 8,448,513 B2
(45) Date of Patent: May 28, 2013

(54) ROTARY DISK GYROSCOPE

(75) Inventor: Yizhen Lin, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 63 days.

(21) Appl. No.: 13/253,849

(22) Filed: Oct. 5, 2011

(65) Prior Publication Data

US 2013/0086985 A1    Apr. 11, 2013

(51) Int. Cl.
*G01C 19/00* (2006.01)

(52) U.S. Cl.
USPC ........................................ 73/504.13

(58) Field of Classification Search
None
See application file for complete search history.

(56) References Cited

U.S. PATENT DOCUMENTS

| | | | |
|---|---|---|---|
| 6,481,283 B1 | 11/2002 | Cardarelli | |
| 6,901,799 B2 | 6/2005 | Chen et al. | |
| 7,406,867 B2 | 8/2008 | Cardarelli | |
| 7,459,834 B2 | 12/2008 | Knowles et al. | |
| 7,694,563 B2 | 4/2010 | Durante et al. | |
| 2002/0189351 A1 | 12/2002 | Reeds et al. | |
| 2004/0231418 A1 | 11/2004 | Jeong et al. | |
| 2006/0112764 A1 * | 6/2006 | Higuchi | 73/504.12 |
| 2007/0214883 A1 | 9/2007 | Durante et al. | |
| 2009/0064780 A1 | 3/2009 | Coronato et al. | |
| 2009/0100930 A1 | 4/2009 | Coronato et al. | |
| 2010/0078740 A1 | 4/2010 | Cazzaniga et al. | |
| 2010/0126269 A1 | 5/2010 | Coronato et al. | |
| 2010/0126272 A1 | 5/2010 | Coronato et al. | |
| 2010/0154541 A1 | 6/2010 | Cazzaniga et al. | |
| 2010/0281977 A1 | 11/2010 | Coronato et al. | |
| 2010/0307243 A1 | 12/2010 | Prandi et al. | |

FOREIGN PATENT DOCUMENTS

DE    EP2184583 B1    5/2010

OTHER PUBLICATIONS

Tsai et al., Design and Simulation of a Dual-Axis Sensing Decoupled Vibratory Wheel Gyroscope, Sensors and Acutators A: Physical, vol. 126, Issue 1, Jan. 26, 2006, pp. 33-40, www.sciencedirect.com.

* cited by examiner

*Primary Examiner* — Robert R Raevis
(74) *Attorney, Agent, or Firm* — Schmeiser, Olsen & Watts LLP; Lowell W. Gresham; Charlene R. Jacobsen

(57) ABSTRACT

A rotary disk gyroscope (20) includes a drive mass (28) and a sense mass (32). The sense mass (32) includes a cutout region (46, 48) located proximate an axis of rotation (40). Torsion springs (38), located in the cutout region (46, 48), connect the sense mass (32) to the drive mass (28). The torsion springs (38) enable the sense mass (32) to rotate about the axis of rotation (40) in response to an angular velocity of the gyroscope (20). Spring anchorage structures (30) are also positioned in the cutout region (46, 48), and flexibly couple the drive mass (28) to the substrate (22). In addition, a drive system (68) resides in the cutout region (46, 48) and actuates the drive mass (28) to move with an oscillatory motion. In a dual axis configuration, the gyroscope (20) further includes a rectangular-shaped second sense mass (36) surrounding the disk-shaped drive mass (28).

20 Claims, 3 Drawing Sheets

ROTARY DISK GYROSCOPE

TECHNICAL FIELD OF THE INVENTION

The present invention relates generally to microelectromechanical systems (MEMS) devices. More specifically, the present invention relates to a MEMS rotary disk gyroscope having a teeter-totter structure.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. Microelectromechanical Systems (MEMS) sensor devices are widely used in applications such as automotive, inertial guidance systems, household appliances, game devices, protection systems for a variety of devices, and many other industrial, scientific, and engineering systems. One example of a MEMS sensor is a MEMS gyroscope. Alternatively referred to as an "angular rate sensor", "gyrometer," "gyroscope sensor," or "yaw rate sensor," a gyroscope is an inertial sensor that senses angular speed or velocity around one or more axes.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Embodiments disclosed herein entail a microelectromechanical (MEMS) inertial sensor device in the form of a gyroscope having one or more teeter-totter type sense masses. In particular, a rotary disk gyroscope includes drive electrodes and drive mass anchorage structures both of which are located at low sensitivity areas of the sense mass. Additionally, the gyroscope can include a second rectangular-shaped outer sense mass in lieu of a conventional ring-shaped sense mass to yield a dual axis gyroscope configuration. These features can enable more efficient die area utilization, reduce susceptibility to package stress, and increase device sensitivity.

Figure 1:
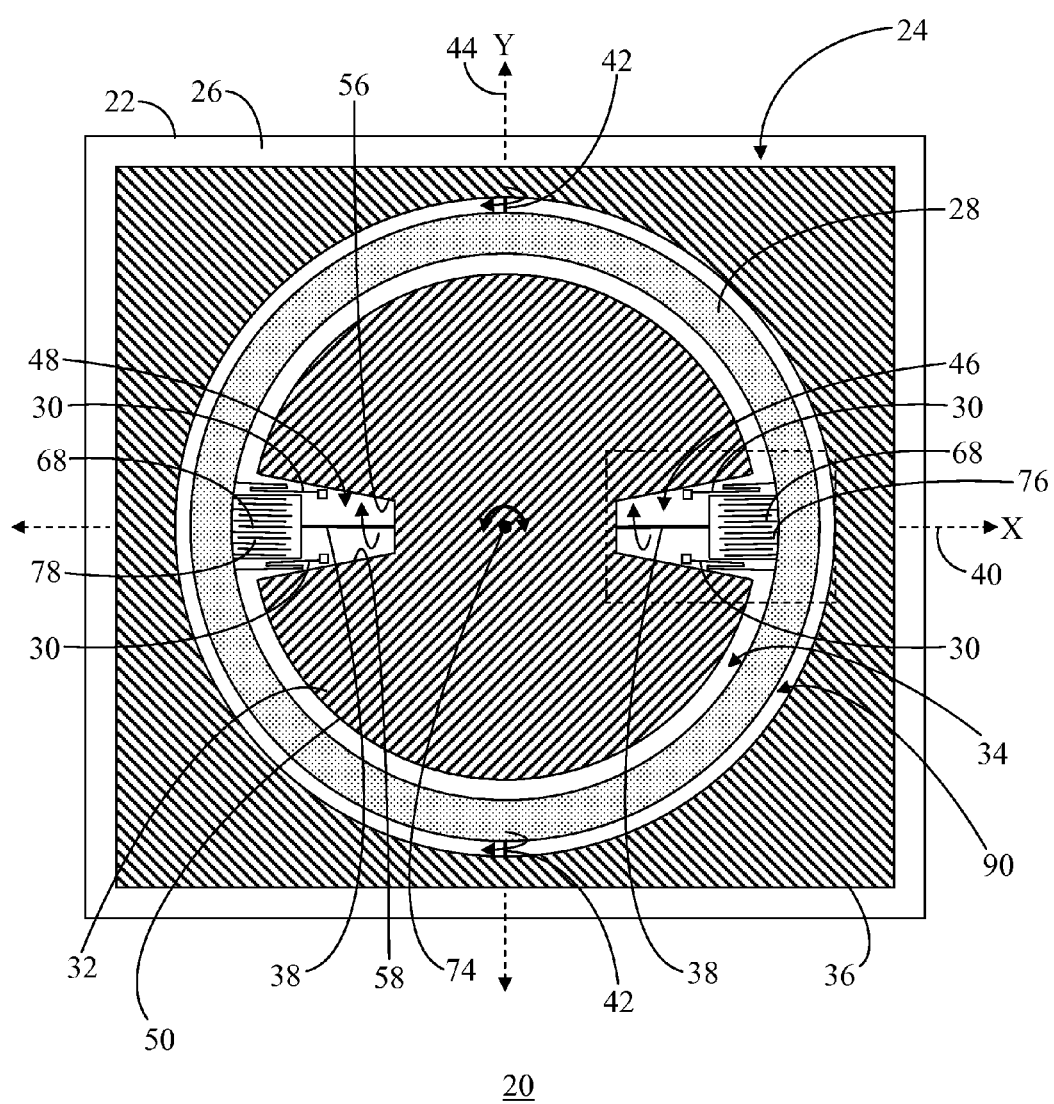
FIG. 1 shows a top view of a microelectromechanical systems (MEMS) rotary disk gyroscope in accordance with an embodiment.
Figure 2:
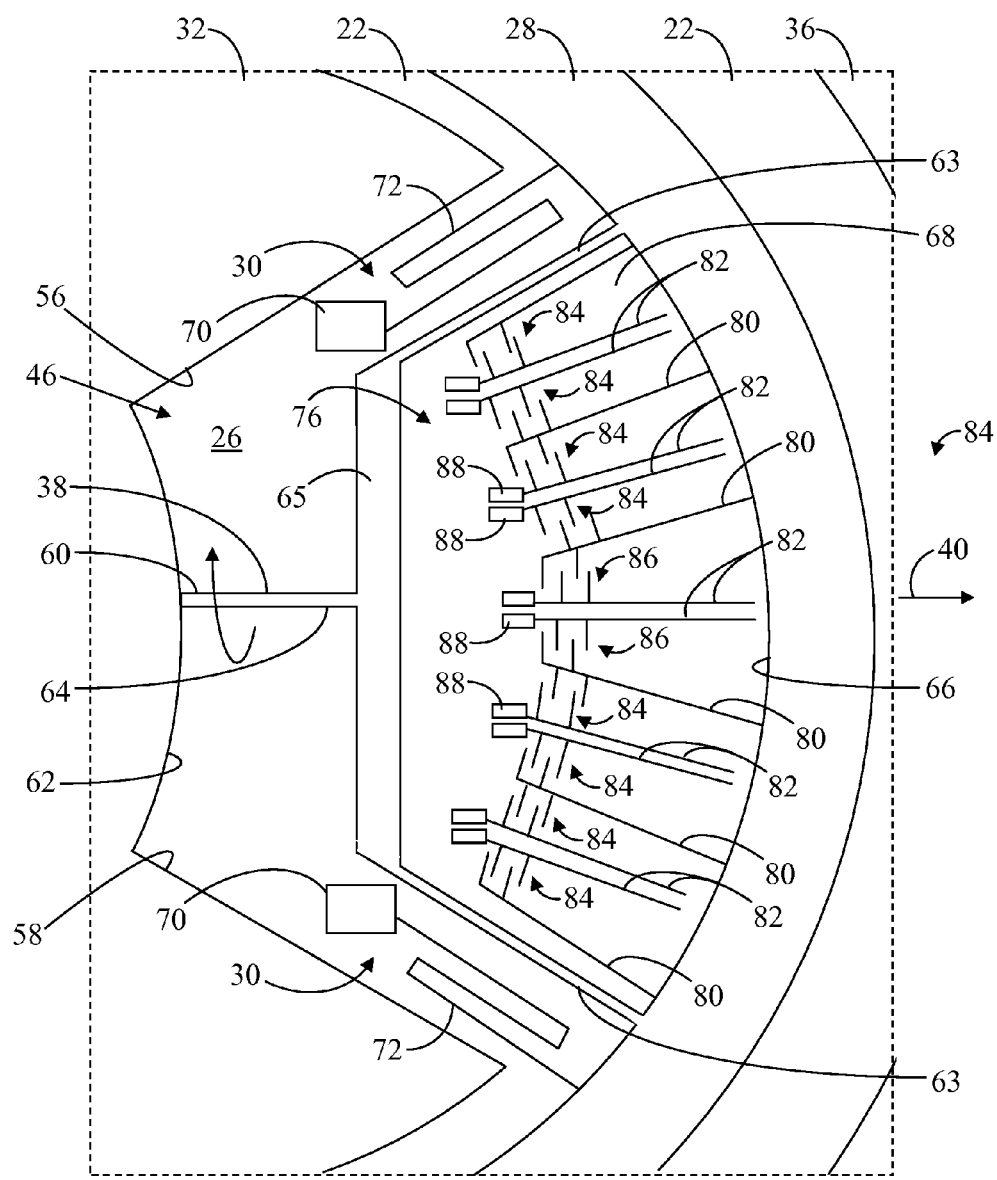
FIG. 2 shows an enlarged partial view of the rotary disk gyroscope of FIG. 1.

Referring to FIGS. 1 and 2, FIG. 1 shows a top view of a microelectromechanical systems (MEMS) rotary disk gyroscope 20 in accordance with an embodiment, and FIG. 2 shows an enlarged partial view of the rotary disk gyroscope 20 delineated by a dashed line box shown in FIG. 1. Gyroscope 20 includes a substrate 22 and a structure 24 coupled to and suspended above a surface 26 of substrate 22. Structure 24 includes a drive mass 28 flexibly coupled to surface 26 of substrate 22 by multiple spring anchorage structures 30. Structure 24 further includes a sense mass 32 residing in a central opening 34 extending through drive mass 28 and another sense mass 36 surrounding drive mass 28.

Drive mass 28 is illustrated with a stippled pattern, sense mass 32 is illustrated with upwardly and rightwardly directed hatching, and sense mass 36 is illustrated with downwardly and rightwardly directed hatching to distinguish the different elements produced within the structural layers of MEMS gyroscope 20. These different elements within the structural layers may be produced utilizing current and upcoming surface micromachining techniques of depositing, patterning, etching, and so forth. Accordingly, although different shading and/or hatching is utilized in the illustrations, the different elements within the structural layers are typically formed out of the same material, such as polysilicon, single crystal silicon, and the like.

The elements of MEMS rotary disk gyroscope 20 (discussed below) may be described variously as being "attached to," "attached with," "coupled to," "connected to," or "interconnected with," other elements of gyroscope 20. However, it should be understood that the terms refer to the direct or indirect physical connections of particular elements of gyroscope 20 that occur during their formation through patterning and etching processes of MEMS fabrication.

Sense mass 32 is connected to drive mass 28 with flexible support elements, i.e., torsion springs 38, that enable sense mass 32 to oscillate or pivot about an axis of rotation 40, i.e., the X-axis in a three-dimensional coordinate system. Accordingly, axis of rotation 40 is referred to herein as X-axis of rotation 40. Sense mass 36 is also attached to drive mass 28 with flexible support elements, i.e., torsion springs 42, that enable sense mass 36 to oscillate or pivot abut a another axis of rotation 44, the Y-axis in a three-dimensional coordinate system. Hence, axis of rotation 44 is referred to herein as Y-axis of rotation 44.

During an exemplary processing method, structure 24 that includes drive mass 28, sense mass 32, and sense mass 36 can be formed by conventional layered deposition, patterning, and etching operations of one or more sacrificial oxide layers, one or more structural polysilicon layers, and the like. For example, one or more sacrificial oxide layers may be deposited overlying substrate 22, and one or more structural layers may then be deposited over the sacrificial layers. The structural layer can then be suitably patterned and etched to form structure 24, torsion springs 38, and torsion springs 42.

Sense mass 32 is a generally circular- or disk-shaped structure having a cutout region 46 and another cutout region 48, both of which are located proximate X-axis of rotation 40. More particularly, each of cutout regions 46 and 48 is a notched region that extends inwardly from an outer perimeter 50 of sense mass 32 toward Y-axis of rotation 44. Accordingly, X-axis of rotation 40 extends through each of cutout regions 46 and 48. Cutout regions 46 and 48 are generally symmetrically positioned in sense mass 32 relative to both axes of rotation 40 and 44. By way of example, cutout regions 46 and 48 are centered at X-axis of rotation 40, and are substantially the same size and shape. Each of cutout regions 46 and 48 includes edges 56 and 58 extending on opposing sides of X-axis of rotation 40 and oriented in a radial direction. In an embodiment, each of edges 56 and 58 may be offset from X-axis of rotation 40 such that an angle formed between edges 56 and 58 is in a range of approximately thirty to ninety degrees. However, the size of cutout regions 46 and 48 can be varied in accordance with particular design requirements of the elements (discussed below) to be located in cutout regions 46 and 48.

Cutout regions 46 and 48 are suitably formed in sense mass 32 at locations that displace the smallest distance as sense mass 32 pivots about X-axis of rotation 40. That is, as sense mass 32 pivots about X-axis of rotation 40, a gap width between the underlying substrate 22 and sense mass 32 changes relative to the distance away from X-axis of rotation 40. The smallest change in gap width occurs closest to X-axis of rotation 40, and the largest change in gap width occurs farthest from X-axis of rotation 40. The sensitivity of gyroscope 20 is a function of the change in gap width in response to angular velocity. Accordingly, the region closest to X-axis of rotation 40 corresponds to an area of lower sensitivity of sense mass 32 relative to the regions farthest away from X-axis of rotation 40. As such, cutout regions 46 and 48 are formed in sense mass 32 at locations that do not unduly decrease the sensitivity of sense mass 32.

Torsion springs 38 partially reside in cutout regions 46 and 48. As exemplified in the enlarged view of FIG. 2, each of torsion springs 38 includes an end 60 coupled to an edge portion 62 of sense mass 32. Each of torsion springs 38 further includes another end 64 coupled to drive mass 28. In an exemplary configuration, drive mass 28 includes a frame structure of two or more bars 63 that extend inwardly from an inner perimeter 66 of drive mass 28 and are coupled to one another via a rigid member 65. Thus, end 64 of each of torsion springs 38 is connected to rigid member 65 of drive mass 28. Additionally, torsion springs 38 are located at and are aligned with X-axis of rotation 40.

In addition to torsion springs 38, spring anchorage structures 30 and at least a portion of a drive system 68 also reside in cutout regions 46 and 48. By their residence in cutout regions 46 and 48, torsion springs 38, spring anchorage structures 30, and drive system 68 may be considered to be "internal" to sense mass 32. This internal location deviates from prior art structures in which the spring anchorage structures 30 and drive system 68 extend outwardly from one or both of drive mass 28 and sense mass 32. Accordingly, size and cost savings is achieved through more efficient die area utilization.

As more clearly seen in FIG. 2, each of spring anchorage structures 30 includes an anchor 70 coupled to surface 26 of substrate 22 underlying cutout regions 46 and 48. Each of spring anchorage structures 30 further includes a spring element 72 extending between inner perimeter 66 of drive mass 28 and fastened to anchor 70. The multiple spring anchorage structures 30, each of which includes spring element 72, are configured to enable drive mass 28 to oscillate about a third axis of rotation, referred to herein as a drive axis 74, that is perpendicular to surface 26 of substrate 22. In this example, drive axis 74 is a Z-axis in a three-dimensional coordinate system.

In an embodiment, anchors 70 for spring anchorage structures 30 are formed on surface 26 of substrate 22 approximately equidistant from X-axis of rotation 40. In addition, since drive mass 28 is a disk-shaped structure having central opening 34, the "center" of drive mass 28 coincides with the "center" of central opening 34, which also coincides with drive axis 74 due to the symmetry of gyroscope 20. Thus, anchors 70 for spring anchorage structures 30 are also approximately equidistant from Y-axis of rotation 44 and drive axis 74.

Many MEMS sensor applications require smaller size and low cost packaging to meet aggressive cost targets. In addition, MEMS sensor applications are calling for lower temperature coefficient of offset (TCO) specifications. The term "offset" refers to the output deviation from its nominal value at the non-excited state of the MEMS sensor. Thus, TCO is a measure of how much thermal stresses effect the performance of a semiconductor device, such as a MEMS sensor. A high TCO indicates correspondingly high thermally induced stress, or a MEMS device that is very sensitive to such stress. The packaging of MEMS sensor applications typically uses materials with dissimilar coefficients of thermal expansion. Thus, an undesirably high TCO can develop during manufacture or operation. These thermal stresses, as well as stresses due to moisture and assembly processes, can result in deformation of the underlying substrate 22, referred to herein as package stress. The internal location and equidistant arrangement of spring anchorage structures 30 serves to reduce the susceptibility of inaccuracies due to package stress occurring from deformation of the underlying substrate 22 by placing anchors 70 as close to one another as possible.

As mentioned briefly above, at least a portion of drive system 68 also resides in cutout regions 46 and 48. Drive system 68 includes a set of drive elements 76 residing in cutout region 46 and another set of drive elements 78 residing in cutout region 48. The sets of drive elements 76 and 78 are comb drives that operate cooperatively to move drive mass 28 with oscillatory motion about drive axis 74.

Each set of drive elements 76 and 78 includes electrodes, referred to herein as comb fingers. The comb fingers will be described in connection with set of drive elements 76 residing in cutout region 46. However, the following discussion applies equivalently to set of drive elements 78 residing in cutout region 48. As more clearly seen in the enlarged view of FIG. 2, set of drive elements 76 includes comb fingers 80 coupled to and extending from inner perimeter 66 of drive mass 28 into cutout region 46. Set of drive elements 76 further includes comb fingers 82 fixed to surface 26 of substrate 22. Comb fingers 82 are spaced apart from and positioned in alternating arrangement with comb fingers 80. By virtue of their attachment to drive mass 28, comb fingers 80 are movable together with drive element 28. Conversely, due to their fixed attachment to substrate 22, comb fingers 82 are stationary relative to comb fingers 80. Accordingly, comb fingers 80 are referred to herein as movable comb fingers 80, and comb fingers 82 are referred to herein as fixed comb fingers 82.

An entire length of fixed comb fingers 82 may be attached to surface 26 of substrate 22 in some embodiments. In alternative embodiments, each of fixed comb fingers 82 may be anchored to surface 26 of substrate 22 at a single location as represented by anchors 88 with the remaining portion of each of fixed comb fingers 82 being suspended above surface 26. This second approach can be desirable in some embodiments to achieve greater efficiencies in usage area and to reduce susceptibility to package stress.

In an embodiment, some of fixed comb fingers 82 function as drive actuation unit (DAU) electrodes 84 and others of fixed comb fingers 82 function as drive measurement unit (DMU) electrodes 86, where DAU electrodes 84 and DMU electrodes 86 are oriented approximately tangential to drive axis 74 (FIG. 1). In general, an alternating current (AC) voltage is applied to DAU electrodes 84 to cause drive mass 28 to oscillate about drive axis 74 (FIG. 1). As drive mass 28 oscillates, it causes a capacitance at DMU electrodes 86 to change. A drive circuit (not shown) monitors the capacitance at DMU electrodes 86 in order to ascertain the oscillation amplitude of drive mass 28. The drive circuit typically includes feedback control (i.e., automatic gain control). By monitoring the capacitance at DMU electrodes 86, drive mass 28 can be suitably controlled to maintain relatively constant oscillation amplitude (typically two to twenty microns by design).

In the illustrated example, each set of drive elements 76 and 78 includes four DAU electrodes 84 and one DMU electrode 86. Those skilled in the art should readily recognize that the quantity of each of DAU electrodes 84 and DMU electrodes 86 will vary in accordance with design requirements, such as needed drive capacity from DAU electrodes 84 and suitable change in capacitance at DMU electrodes 86. Typically, however, there is a greater quantity of DAU electrodes 84 than DMU electrodes 86 in order to produce sufficient force to oscillate drive mass 28.

Referring back to FIG. 1, drive mass 28 is a generally ring-shaped, or circular, structure. In an embodiment, sense mass 36 is a generally rectangular-shaped structure having a central opening 90 configured to accommodate the ring-shaped structure of drive mass 28. The rectangular-shaped structure of sense mass 36 reclaims wasted die area (discussed in connection with FIG. 3), as compared to ring-shaped outer sense masses of prior art devices, to effectively increase the sensitivity of sense mass 36.

Figure 3:
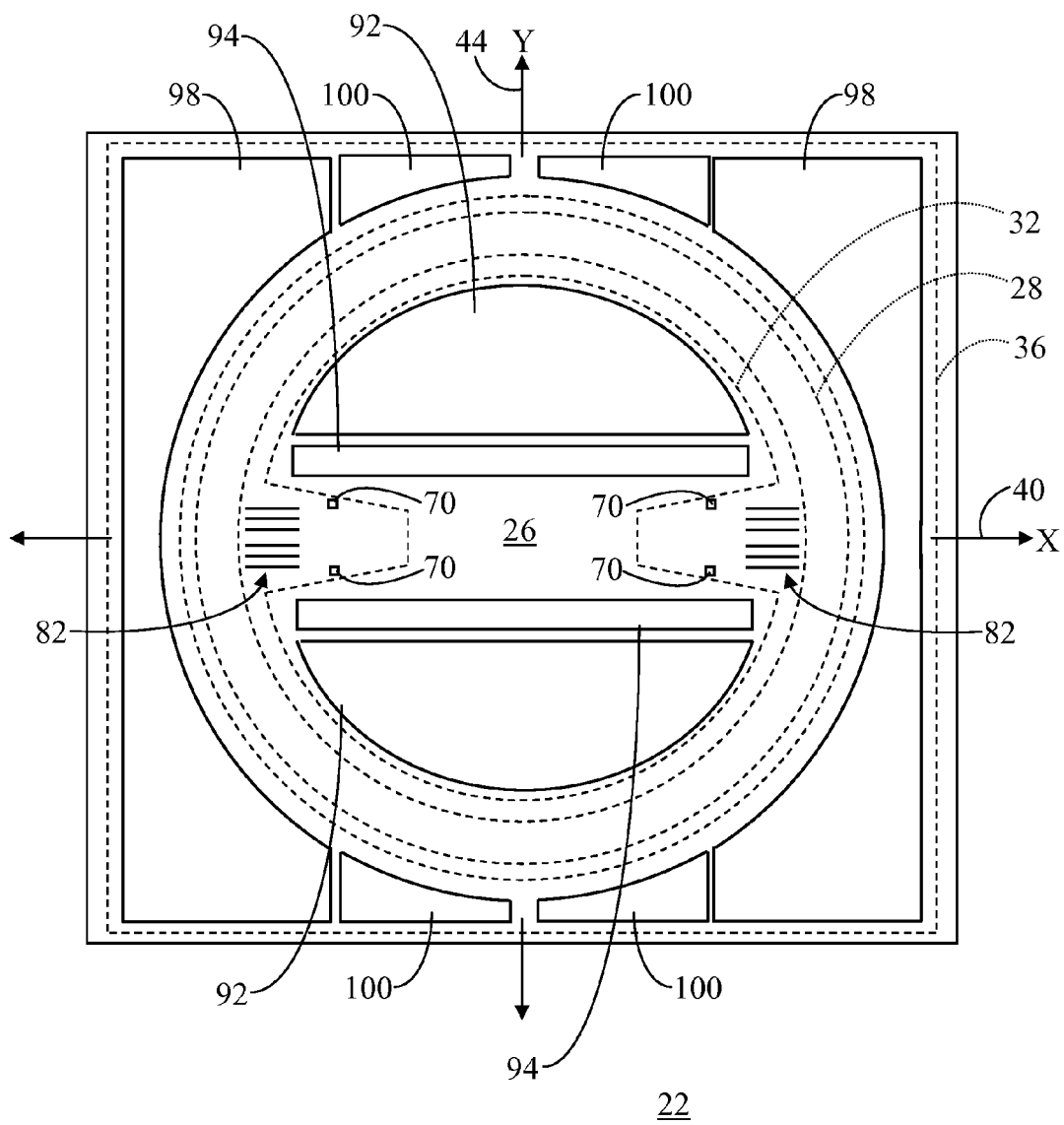
FIG. 3 shows a top view of a substrate underlying a proof mass structure of the rotary disk gyroscope of FIG. 1.

FIG. 3 shows a top view of substrate 22 underlying structure 24 of rotary disk gyroscope 20 (FIG. 1). Anchors 70 and fixed comb fingers 82 are formed on surface 26 of substrate 22. A variety of conductive plates, or electrodes, are formed on surface 26 of substrate 22 in conjunction with anchors 70 and fixed comb fingers 82. The electrodes include X-sensing electrodes 92 and X-tuning electrodes 94 underlying sense mass 32. The electrodes additionally include Y-sensing electrodes 98 and Y-tuning electrodes 100 underlying sense mass 36.

Substrate 22 can include a semiconductor layer (not shown) that is covered by one or more insulation layers (not shown). The semiconductor layer is typically a silicon wafer upon which electronics associated with rotary disk gyroscope 20 may, in some cases, also be fabricated using conventional manufacturing technologies. The insulating layer may include glass, silicon dioxide, silicon nitride, or any other compatible material. Electrodes 92, 94, 98, and 100 may be formed in the semiconductor layer and underlying sense masses 32 and 36. Conductors (not shown) can be formed on substrate 22 to provide separate electrical connections to electrodes 92, 94, 98, and 100 and to sense masses 32 and 36. Electrodes 92, 94, 98, and 100 are formed from a conductive material such as polysilicon, and can be formed at the same time as the respective conductors if the same materials are chosen for such components.

Drive mass 28, sense mass 32, and sense mass 36 are represented in dashed line form to illustrate their physical placement relative to electrodes 92, 94, 98, and 100. However, it should be readily understood that in a top view of rotary disk gyroscope 20 (illustrated in FIG. 1), drive mass 28, sense mass 32, and sense mass 36 would obscure the underlying electrodes 92, 94, 98, and 100.

To operate rotary disk gyroscope 20 (FIG. 1), structure 24 (FIG. 1) that includes drive mass 28, sense mass 32, and sense mass 36 is mechanically oscillated in a plane generally parallel to surface 26 of substrate 22. That is, drive mass 28 is actuated by drive system 68 (FIG. 1) to oscillate about drive axis 74 (FIG. 1). Each of sense masses 32 and 36 oscillate together with drive mass 28 when drive mass 28 is driven by drive system 68. Once put into oscillatory motion, sense mass 32 is capable of detecting angular velocity, i.e., the angular rotation rate, of gyroscope 20 about Y-axis of rotation 44, where the angular velocity about Y-axis of rotation 44 produces a Coriolis acceleration that causes sense mass 32 to oscillate about X-axis of rotation 40 at an amplitude that is proportional to the angular velocity of gyroscope 20 about Y-axis of rotation 44. By a similar principle, sense mass 36 is capable of detecting angular velocity of gyroscope 20 about X-axis of rotation 40. That is, as gyroscope 20 experiences an angular velocity about X-axis of rotation 40, a Coriolis acceleration is produced that causes sense mass 36 to oscillate about Y-axis of rotation 44 at an amplitude that is proportional to the angular velocity of gyroscope about X-axis of rotation 40. Thus, gyroscope 20 provides dual axis sensing.

X-sensing electrodes 92 and Y-sensing electrodes 98 are configured to detect their respective output signals. More particularly, X-sensing electrodes 92 detect an output signal as the angular velocity of gyroscope 20 about its input axis, specifically Y-axis 44. Similarly, Y-sensing electrodes 98 detect an output signal as the angular velocity of gyroscope 20 about its input axis, specifically X-axis 40. Frequency tuning, also referred to as electrostatic tuning, of the resonant modes in MEMS gyroscopes is typically implemented as a means for compensating for manufacturing aberrations that produce detuned resonances. In an embodiment, tuning voltages may be applied to X-tuning electrodes 94 and/or Y-tuning electrodes 100 to compensate for these manufacturing aberrations.

X-tuning electrodes and Y-tuning electrodes 94 and 100 are positioned closer to their respective X- and Y-axes of rotation 40 and 44 relative to the position of X- and Y-sensing electrodes 92 and 98. The sensitivity of X-sensing electrodes 92 to the angular velocity about Y-axis of rotation 44 is a function of the change in gap width between sense mass 32 and substrate 26 as sense mass 32 oscillates about X-axis of rotation 40. And this gap width is a function of the angular velocity and the distance to the X-axis of rotation 40. Accordingly, the regions of highest sensitivity of sense mass 32 to angular velocity are the "outboard" regions farthest from X-axis of rotation 40. As such, X-sensing electrodes 94 are located at these outboard regions to produce a greater signal and therefore enhance the sensitivity of gyroscope 20 to angular velocity about Y-axis of rotation 44.

Likewise, the sensitivity of Y-sensing electrodes 100 to the angular velocity about X-axis of rotation 40 is a function of the change in gap width between sense mass 36 and substrate 26 as sense mass 36 oscillates about Y-axis of rotation 44. And this gap width is a function of the angular velocity and the distance to the X-axis of rotation 40. Moreover, the shape of Y-sensing electrodes 100 correspond to the rectangular structure of sense mass 36. The regions of highest sensitivity of sense mass 36 to angular velocity are the "outboard" regions farthest from Y-axis of rotation 44. Y-sensing electrodes 100 are located at these outboard regions and in the greater area achieved by the rectangular configuration of sense mass 36 to produce a greater signal, and therefore enhance the sensitivity of gyroscope 20 to angular velocity about X-axis of rotation 40.

The example provided above is a dual-axis sensing rotary disk gyroscope. Those skilled in the art will readily appreciate that in alternative embodiments, a single axis gyroscope configuration may be provided that does not include sense mass 36, but still achieves benefits associated with the "internal" location of spring anchorage structures 30, torsion springs 38, and drive system 68. Additionally, the example provided above shows a straight bar for each of torsion springs 38 and 42 located on respective axes of rotation at zero, ninety, one hundred eighty, and two hundred seventy degree orientations. In alternative embodiments, torsion springs 38 and/or 42 may take on other structural configurations, such as folded springs. Moreover, the torsion springs can be located at other suitable positions between drive mass 28 and sense masses 32 and 36. In addition, rotary disk gyroscope 20 is illustrated with two different electrode types, i.e., sensing electrodes 92 and 98, and tuning electrodes 94 and 100. It should be understood, however, that in alternative embodiments, additional electrode types may be provided for force feedback and/or quadrature compensation.

In summary, embodiments of the invention entail microelectromechanical systems (MEMS) inertial sensor devices in the form of a gyroscope having one or more teeter-totter type sense masses. In particular, a rotary disk gyroscope includes torsion springs, drive electrodes, and drive mass anchorage structures all of which are located in cutout regions formed at low sensitivity areas in a central sense mass. Additionally, the gyroscope can include a second rectangular-shaped outer sense mass in lieu of a conventional ring-shaped sense mass to yield a dual axis gyroscope configuration. These features can enable more efficient die area utilization, reduce susceptibility to package stress, and increase device sensitivity.

Although the preferred embodiments of the invention have been illustrated and described in detail, it will be readily apparent to those skilled in the art that various modifications may be made therein without departing from the spirit of the invention or from the scope of the appended claims. That is, it should be appreciated that the exemplary embodiments are only examples, and are not intended to limit the scope, applicability, or configuration of the invention.

What is claimed is:

1. A gyroscope comprising:
   a substrate having a surface;
   a drive mass flexibly coupled to said substrate surface, said drive mass having a central opening;
   a sense mass residing in said central opening and configured to rotate about an axis of rotation, said sense mass including a cutout region proximate said axis of rotation;
   torsion springs connecting said sense mass to said drive mass; and
   a drive system at least partially residing in said cutout region for actuating said drive mass to move with an oscillatory motion.

2. A gyroscope as claimed in claim 1 wherein said cutout region extends inwardly as a notched region from an outer perimeter of said sense mass.

3. A gyroscope as claimed in claim 1 wherein said axis of rotation extends through said cutout region.

4. A gyroscope as claimed in claim 1 wherein said cutout region includes first and second edges oriented in a radial direction and extending on opposing sides of said axis of rotation.

5. A gyroscope as claimed in claim 1 wherein at least one of said torsion springs partially resides in said cutout region and is aligned with said axis of rotation.

6. A gyroscope as claimed in claim 1 wherein said cutout region is a first cutout region, and said sense mass further comprises a second cutout region proximate said axis of rotation, said first and second cutout regions being substantially symmetrically positioned in said sense mass relative to one another on opposing sides of an axis that is perpendicular to said axis of rotation.

7. A gyroscope as claimed in claim 6 wherein said drive system comprises:
   a first set of drive elements residing in said first cutout region; and
   a second set of drive elements residing in said second cutout region, said second set of drive elements operating cooperatively with said first set of drive elements to move said drive mass with said oscillatory motion.

8. A gyroscope as claimed in claim 1 wherein an inner perimeter of said drive mass defines said central opening, and said drive system comprises:
   first comb fingers extending from said inner perimeter of said drive mass into said cutout region; and
   second comb fingers fixed to said surface of said substrate, said second comb fingers being spaced apart from and positioned in an alternating arrangement with said first comb fingers.

9. A gyroscope as claimed in claim 8 wherein said first and second comb fingers are located in said cutout region adjacent to at least one of said torsion springs.

10. A gyroscope as claimed in claim 1 wherein an inner perimeter of said drive mass defines said central opening, and said gyroscope further comprises:
    anchors coupled to said surface of said substrate underlying said cutout region; and
    spring elements configured to fasten said drive mass to said anchors, one each of said spring elements extending between said inner perimeter of said drive mass and one each of said anchors to form multiple spring anchorage structures.

11. A gyroscope as claimed in claim 1 wherein said sense mass is a first sense mass, said torsion springs are first torsion springs, and said gyroscope further comprises:
    a second sense mass surrounding said drive mass; and
    second torsion springs connecting said second sense mass to said drive mass.

12. A gyroscope as claimed in claim 11 wherein:
    said drive mass is a ring-shaped structure; and
    said second sense mass is rectangular-shaped structure, said second sense mass having a central opening configured to accommodate said ring-shaped structure of said drive mass.

13. A gyroscope comprising:
    a substrate having a surface;
    a drive mass flexibly coupled to said substrate surface, said drive mass having a central opening;
    a sense mass residing in said central opening and configured to rotate about an axis of rotation, said sense mass including first and second cutout regions proximate said axis of rotation, said first and second cutout regions being substantially symmetrically positioned in said sense mass relative to one another on opposing sides of an axis that is perpendicular to said axis of rotation;
    a first torsion spring partially residing in said first cutout region;
    a second torsion spring partially residing in said second cutout region, said first and second torsion springs connecting said sense mass to said drive mass, each of said first and second torsions springs being aligned with said axis of rotation; and
    a drive system at least partially residing in at least one of said first and second cutout regions for actuating said drive mass to move with an oscillatory motion.

14. A gyroscope as claimed in claim 13 further comprising:
    anchors coupled to said surface of said substrate underlying each of said first and second cutout regions;
    spring elements configured to fasten said drive mass to said anchors, one each of said spring elements extending between an inner perimeter of said drive mass and one each of said anchors to form multiple spring anchorage structures.

15. A gyroscope as claimed in claim 13 wherein said drive system comprises:
    a first set of drive elements residing in said first cutout region; and
    a second set of drive elements residing in said second cutout region, said second set of drive elements operating cooperatively with said first set of drive elements to move said drive mass with said oscillatory motion.

16. A gyroscope as claimed in claim 15 wherein each of said first and second set of drive elements comprises:
- first comb fingers extending from an inner perimeter of said drive mass into one said first and second cutout regions; and
- second comb fingers fixed to said surface of said substrate, said second comb fingers being spaced apart from and positioned in an alternating arrangement with said first comb fingers.

17. A gyroscope comprising:
- a substrate having a surface;
- a drive mass flexibly coupled to said substrate surface, said drive mass having a central opening;
- a sense mass residing in said central opening and configured to rotate about an axis of rotation, said sense mass including first and second cutout regions proximate said axis of rotation, each of said first and second cutout regions extending inwardly as a notched region from an outer perimeter of said sense mass;
- a first torsion spring partially residing in said first cutout region;
- a second torsion spring partially residing in said second cutout region, said first and second torsion springs connecting said sense mass to said drive mass, and said first and second torsion springs being aligned with said axis of rotation; and
- a drive system at least partially residing in said first and second cutout regions for actuating said drive mass to move with an oscillatory motion.

18. A gyroscope as claimed in claim 17 wherein an inner perimeter of said drive mass defines said central opening, and said drive system comprises:
- first comb fingers extending from said inner perimeter of said drive mass into one of said first and second cutout regions; and
- second comb fingers fixed to said surface of said substrate, said second comb fingers being spaced apart from and positioned in an alternating arrangement with said first comb fingers.

19. A gyroscope as claimed in claim 18 further comprising:
- anchors coupled to said surface of said substrate underlying said first and second cutout regions; and
- spring elements configured to fasten said drive mass to said anchors, one each of said spring elements extending between said inner perimeter of said drive mass and one each of said anchors to form multiple spring anchorage structures co-located with said drive system and said first and second torsion springs in said first and second cutout regions.

20. A gyroscope as claimed in claim 17 wherein said sense mass is a first sense mass and said gyroscope further comprises:
- a second sense mass surrounding said drive mass; and
- third torsion springs connecting said second sense mass to said drive mass, said drive mass being a ring-shaped structure, said second sense mass having a central opening configured to accommodate said ring-shaped structure of said drive mass, and said second sense mass being a rectangular-shaped structure.

\* \* \* \* \*